US012134114B2

(12) United States Patent
Soontravanich et al.

(10) Patent No.: US 12,134,114 B2
(45) Date of Patent: *Nov. 5, 2024

(54) ACIDIC CLEANER

(71) Applicants: ECOLAB USA INC., St. Paul, MN (US); BASF SE, Ludwigshafen (DE)

(72) Inventors: Sukhwan Soontravanich, Inver Grove Heights, MN (US); Chris Nagel, St. Paul, MN (US); Jennifer Stokes, Rosemount, MN (US); Claire Notermann, Sunfish Lake, MN (US); James S. Dailey, Grosse Ile, MI (US); Thomas B. Gessner, Ypsilanti, MI (US); Joseph P. Borst, Plymouth, MI (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 17/845,885

(22) Filed: Jun. 21, 2022

(65) Prior Publication Data

US 2022/0396751 A1 Dec. 15, 2022

Related U.S. Application Data

(63) Continuation of application No. 16/682,547, filed on Nov. 13, 2019, now Pat. No. 11,421,191.

(60) Provisional application No. 62/767,797, filed on Nov. 15, 2018.

(51) Int. Cl.

| | |
|---|---|
| ***C11D 1/72*** | (2006.01) |
| ***B08B 3/08*** | (2006.01) |
| ***B08B 3/10*** | (2006.01) |
| ***C11D 1/722*** | (2006.01) |
| ***C11D 3/04*** | (2006.01) |
| ***C11D 3/20*** | (2006.01) |

(52) U.S. Cl.

CPC .................. *B08B 3/08* (2013.01); *B08B 3/10* (2013.01); *B08B 3/106* (2013.01); *C11D 1/72* (2013.01); *C11D 1/722* (2013.01); *C11D 3/042* (2013.01); *C11D 3/2075* (2013.01); *C11D 3/2079* (2013.01); *C11D 3/2082* (2013.01); *C11D 3/2086* (2013.01); *C11D 2111/20* (2024.01)

(58) Field of Classification Search

CPC ......... C11D 1/72; C11D 1/722; C11D 3/2075; C11D 3/2079; C11D 3/042; C11D 11/0041; B08B 3/08; B08B 3/10

USPC .... 510/234, 421, 477, 488, 505; 134/39, 40, 134/42

See application file for complete search history.

(56) References Cited

U.S. PATENT DOCUMENTS

| | | | |
|---|---|---|---|
| 2,132,511 | A | 10/1938 | Hentrich et al. |
| 3,150,096 | A | 9/1964 | Schmidt et al. |
| 3,650,965 | A | 3/1972 | Cantor et al. |
| 3,650,966 | A | 3/1972 | Bakka |
| 3,822,212 | A | 7/1974 | Bryant et al. |
| 4,127,654 | A | 11/1978 | Inoue et al. |

(Continued)

FOREIGN PATENT DOCUMENTS

| | | | |
|---|---|---|---|
| AU | 528029 | B2 | 4/1983 |
| AU | 2012258459 | B2 | 10/2013 |

(Continued)

*Primary Examiner* — Gregory R Delcotto

(74) *Attorney, Agent, or Firm* — Merchant & Gould P.C.

(57) ABSTRACT

Methods and compositions for cleaning industrial equipment (e.g. biofuel or corn ethanol plant equipment) in place at high temperatures using acidic methane sulfonic acid compositions having a low pH.

30 Claims, 1 Drawing Sheet

(56) References Cited

U.S. PATENT DOCUMENTS 4,212,759 A 7/1980 Young et al.
4,404,040 A 9/1983 Wang
4,683,074 A 7/1987 Malik et al.
4,715,980 A 12/1987 Lopes et al.
4,749,508 A 6/1988 Cockrell, Jr. et al.
4,822,513 A 4/1989 Corby
4,923,523 A 5/1990 Schluessler
4,940,493 A 7/1990 Neidiffer et al.
4,965,009 A 10/1990 Baur et al.
5,000,867 A 3/1991 Heinhuis-Walther et al.
5,137,793 A 8/1992 Cockrell, Jr.
5,358,572 A 10/1994 Yeh
5,364,551 A 11/1994 Lentsch et al.
5,424,000 A 6/1995 Winicov et al.
5,514,293 A 5/1996 Shimakura et al.
5,797,986 A 8/1998 Rolando et al.
5,879,470 A 3/1999 Murch et al.
5,998,358 A 12/1999 Herdt et al.
6,121,219 A 9/2000 Herdt et al.
6,197,738 B1 3/2001 Regutti
6,218,349 B1 4/2001 Kravitz et al.
6,341,612 B1 1/2002 Duckett et al.
6,346,279 B1 2/2002 Rochon
6,391,122 B1 5/2002 Votteler et al.
6,432,906 B1 8/2002 Carlson et al.
6,455,480 B1 9/2002 Bunting
6,472,358 B1 10/2002 Richter et al.
6,514,509 B2 2/2003 Tabasso
6,617,290 B2 9/2003 Lopes
6,770,150 B1 8/2004 Duckett et al.
6,840,251 B2 1/2005 Gill et al.
6,927,237 B2 8/2005 Hei et al.
7,033,982 B1 4/2006 Rager
7,041,177 B2 5/2006 Ruhr et al.
7,144,846 B2 12/2006 Keller et al.
7,256,167 B2 8/2007 Cheung et al.
7,323,436 B2 1/2008 Kemp et al.
7,402,553 B1 7/2008 Perry
7,494,963 B2 2/2009 Ahmed et al.
7,569,232 B2 8/2009 Man et al.
7,942,980 B2 5/2011 Maier et al.
7,943,565 B2 5/2011 Kany et al.
7,998,278 B2 8/2011 Hackenberger et al.
8,022,028 B2 9/2011 Szewczyk et al.
8,110,603 B2 2/2012 Kawabata et al.
8,114,222 B2 2/2012 Fernholz et al.
8,119,588 B2 2/2012 Bernhardt et al.
8,143,204 B2 3/2012 Fernholz et al.
8,247,362 B2 8/2012 Murphy et al.
8,262,805 B2 9/2012 Hodge et al.
8,334,120 B2 12/2012 Dicosimo et al.
8,383,566 B2 2/2013 Zhu
8,383,570 B2 2/2013 Kieffer et al.
8,388,990 B2 3/2013 Morelli et al.
8,426,349 B2 4/2013 Monken
8,618,037 B2 12/2013 Schacht et al.
8,648,026 B2 2/2014 Borst et al.
8,722,609 B2 5/2014 Choczaj et al.
8,828,910 B2 9/2014 Aksela et al.
8,835,140 B2 9/2014 Fernholz et al.
8,853,446 B2 10/2014 MacDonald, II et al.
8,871,698 B2 10/2014 Podella et al.
8,871,807 B2 10/2014 Gohl et al.
8,921,298 B2 12/2014 Tyborski
9,012,504 B2 4/2015 Olson et al.
9,103,038 B2 8/2015 Mohs et al.
9,259,006 B2 2/2016 Lemons
9,416,375 B2 8/2016 Fernholz et al.
9,476,017 B2 10/2016 Theyssen et al.
9,650,597 B2 5/2017 Kónya et al.
9,655,368 B2 5/2017 Bui et al.
9,676,711 B2 6/2017 Junzhong et al.
9,701,931 B2 7/2017 Moore
9,765,285 B2 9/2017 Man et al.
9,845,290 B2 12/2017 Balasubramanian et al.
9,888,684 B2 2/2018 Man et al.
10,017,720 B2 7/2018 Li et al.
11,421,191 B1 8/2022 Soontravanich et al.
2003/0059483 A1 3/2003 Sowle et al.
2003/0175362 A1 9/2003 Kross et al.
2004/0171505 A1 9/2004 Nonami et al.
2004/0176262 A1 9/2004 Hammock
2006/0035808 A1 2/2006 Ahmed et al.
2006/0079424 A1 4/2006 Perry
2006/0180795 A1 8/2006 McCormick
2007/0275929 A1 11/2007 Fuls et al.
2008/0139656 A1 6/2008 Taylor et al.
2009/0199875 A1 8/2009 Fernholz et al.
2009/0200234 A1 8/2009 Schacht et al.
2010/0009892 A1 1/2010 Hauke
2010/0120656 A1 5/2010 McGee et al.
2010/0236581 A1 9/2010 Fernholz et al.
2011/0028379 A1 2/2011 Baek
2011/0056516 A1 3/2011 Adair et al.
2011/0092407 A1 4/2011 Murphy et al.
2011/0108069 A1 5/2011 Zwanziger et al.
2012/0117741 A1 5/2012 Patterson
2012/0283165 A1 11/2012 Man et al.
2013/0000681 A1 1/2013 Johnson et al.
2014/0041686 A1 2/2014 Ryther et al.
2014/0113001 A1 4/2014 Ramirez et al.
2014/0121272 A1 5/2014 Smith et al.
2015/0010646 A1 1/2015 Tiekemeier et al.
2015/0152364 A1 6/2015 Theyssen et al.
2016/0074549 A1 3/2016 Lei et al.
2016/0102275 A1 4/2016 Erickson et al.
2017/0064949 A1 3/2017 Kraus et al.
2017/0173642 A1 6/2017 Li et al.
2017/0295784 A1 10/2017 Bolduc et al.
2017/0335254 A1 11/2017 Man et al.
2018/0110220 A1 4/2018 Anderson et al.
2018/0155841 A1 6/2018 Thomson
2018/0187129 A1 7/2018 Traistaru et al.

FOREIGN PATENT DOCUMENTS

AU 2014202437 A1 5/2014
BR 0100883 A 1/2003
BR 0100884 A 1/2003
CA 1107643 A 8/1981
CA 2078117 C 8/2001
CA 2 466 357 A1 6/2003
CA 2 361 741 C 4/2005
CA 2 454 437 A1 6/2005
CA 2 886 149 A1 4/2016
CA 2 925 635 A1 9/2017
CA 2 768 112 C 3/2018
CN 1036074 C 10/1997
CN 101233852 A 8/2008
CN 101573117 A 11/2009
CN 1934290 B 8/2011
CN 102690736 A 9/2012
CN 101232807 B 12/2012
CN 103074180 A 5/2013
CN 103146505 A 6/2013
CN 104017668 A 9/2014
CN 104673534 A 6/2015
CN 105154255 A 12/2015
CN 104981158 B 12/2017
CN 107413716 A 12/2017
CN 105232574 B 2/2018
CN 107937149 A 4/2018
CN 108289964 A 7/2018
DE 27 05 561 A1 8/1978
DE 43 10 995 A1 10/1994
DE 20 2017 107 723 U1 1/2018
EP 0 018 492 B1 7/1982
EP 0 147 102 A2 7/1985
EP 0 087 049 B1 11/1986
EP 0 157 382 B1 8/1988
EP 0 264 826 B1 12/1993
EP 0 531 360 B1 4/1995
EP 0 651 047 A2 5/1995
EP 0 647 263 B1 5/1996

(56) References Cited

FOREIGN PATENT DOCUMENTS

| | | | |
|---|---|---|---|
| EP | 0 528 697 | B1 | 10/1996 |
| EP | 0 524 075 | B1 | 2/1997 |
| EP | 0 778 880 | B1 | 10/1998 |
| EP | 0 783 245 | B1 | 11/1998 |
| EP | 0 808 212 | B1 | 4/1999 |
| EP | 0 751 211 | B1 | 9/2001 |
| EP | 0 879 276 | B1 | 11/2001 |
| EP | 0 863 850 | B1 | 2/2002 |
| EP | 0 772 971 | B1 | 3/2002 |
| EP | 1 143 799 | B1 | 4/2003 |
| EP | 1 052 894 | B1 | 5/2003 |
| EP | 1 239 729 | B1 | 2/2004 |
| EP | 1 311 653 | B1 | 5/2004 |
| EP | 1 155 109 | B1 | 4/2006 |
| EP | 1 693 437 | A1 | 8/2006 |
| EP | 1 567 289 | B1 | 5/2007 |
| EP | 1 409 632 | B1 | 7/2007 |
| EP | 1 478 232 | B1 | 10/2007 |
| EP | 1 709 145 | B1 | 6/2009 |
| EP | 1 824 958 | B1 | 1/2010 |
| EP | 1 994 129 | B1 | 6/2010 |
| EP | 1 725 645 | B1 | 10/2010 |
| EP | 2 164 944 | B1 | 3/2013 |
| EP | 2 155 867 | B1 | 10/2015 |
| EP | 2 342 327 | B1 | 2/2016 |
| EP | 2 723 847 | B1 | 7/2016 |
| EP | 2 227 532 | B1 | 8/2016 |
| EP | 2 249 975 | B1 | 5/2017 |
| EP | 2 408 894 | B1 | 5/2017 |
| FR | 2 528 448 | A1 | 12/1983 |
| GB | 857119 | A | 12/1960 |
| GB | 882569 | A | 11/1961 |
| HU | 54468 | T | 3/1991 |
| IN | 1879/MUM/2015 | | 5/2017 |
| JP | 2776713 | B2 | 5/1998 |
| JP | 3091841 | B2 | 9/2000 |
| JP | 2001-131586 | A | 5/2001 |
| JP | 2001-179194 | A | 7/2001 |
| JP | 3423971 | B2 | 7/2003 |
| JP | 3425246 | B2 | 7/2003 |
| JP | 2003-226988 | A | 8/2003 |
| JP | 2003-292996 | A | 10/2003 |
| JP | 2004-66159 | A | 3/2004 |
| JP | 2004-203947 | A | 7/2004 |
| JP | 2004-217827 | A | 8/2004 |
| JP | 2004-244345 | A | 9/2004 |
| JP | 2005-154560 | A | 6/2005 |
| JP | 2007-77290 | A | 3/2007 |
| JP | 3983353 | B2 | 9/2007 |
| JP | 2009-242851 | A | 10/2009 |
| JP | 4558955 | B2 | 10/2010 |
| JP | 4973835 | B2 | 7/2012 |
| JP | 5001612 | B2 | 8/2012 |
| JP | 5048277 | B2 | 10/2012 |
| JP | 2013-216832 | A | 10/2013 |
| JP | 5326239 | B2 | 10/2013 |
| JP | 2015-74668 | A | 4/2015 |
| JP | 6092860 | B2 | 3/2017 |
| KR | 10-2007-0003877 | A | 1/2007 |
| NZ | 260900 | A | 6/1996 |
| RU | 2 160 307 | C1 | 12/2000 |
| WO | 91/18080 | A1 | 11/1991 |
| WO | 93/23517 | A1 | 11/1993 |
| WO | 97/13005 | A1 | 4/1997 |
| WO | 97/42818 | A1 | 11/1997 |
| WO | 00/61715 | A1 | 10/2000 |
| WO | 01/34754 | A1 | 5/2001 |
| WO | 02/068561 | A2 | 9/2002 |
| WO | 2004/074420 | A1 | 9/2004 |
| WO | 2004/074421 | A1 | 9/2004 |
| WO | 2004/074422 | A1 | 9/2004 |
| WO | 2005/001162 | A1 | 1/2005 |
| WO | 2005/070205 | A1 | 8/2005 |
| WO | 2006/136774 | A1 | 12/2006 |
| WO | 2007/013324 | A1 | 2/2007 |
| WO | 2007/085188 | A1 | 8/2007 |
| WO | 2008/080097 | A1 | 7/2008 |
| WO | 2008/145605 | A1 | 12/2008 |
| WO | 2009/099419 | A2 | 8/2009 |
| WO | 2009/118714 | A2 | 10/2009 |
| WO | 2009/125336 | A2 | 10/2009 |
| WO | 2009/137722 | A1 | 11/2009 |
| WO | 2009/154615 | A1 | 12/2009 |
| WO | 2011/036628 | A2 | 3/2011 |
| WO | 2011/039524 | A1 | 4/2011 |
| WO | 2011/112674 | A2 | 9/2011 |
| WO | 2011/135366 | A2 | 11/2011 |
| WO | 2012/010197 | A1 | 1/2012 |
| WO | 2012/010198 | A1 | 1/2012 |
| WO | 2012/035156 | A1 | 3/2012 |
| WO | 2012/123695 | A2 | 9/2012 |
| WO | 2012/155986 | A1 | 11/2012 |
| WO | 2012/160185 | A2 | 11/2012 |
| WO | 2013/043699 | A2 | 3/2013 |
| WO | 2013/050562 | A1 | 4/2013 |
| WO | 2014/100166 | A1 | 6/2014 |
| WO | 2014/127451 | A1 | 8/2014 |
| WO | 2015/077737 | A1 | 5/2015 |
| WO | 2016/100694 | A1 | 6/2016 |
| WO | 2016/179009 | A1 | 11/2016 |
| WO | 2017/007416 | A1 | 1/2017 |
| WO | 2017/177016 | A1 | 10/2017 |
| WO | 2017/205649 | A1 | 11/2017 |

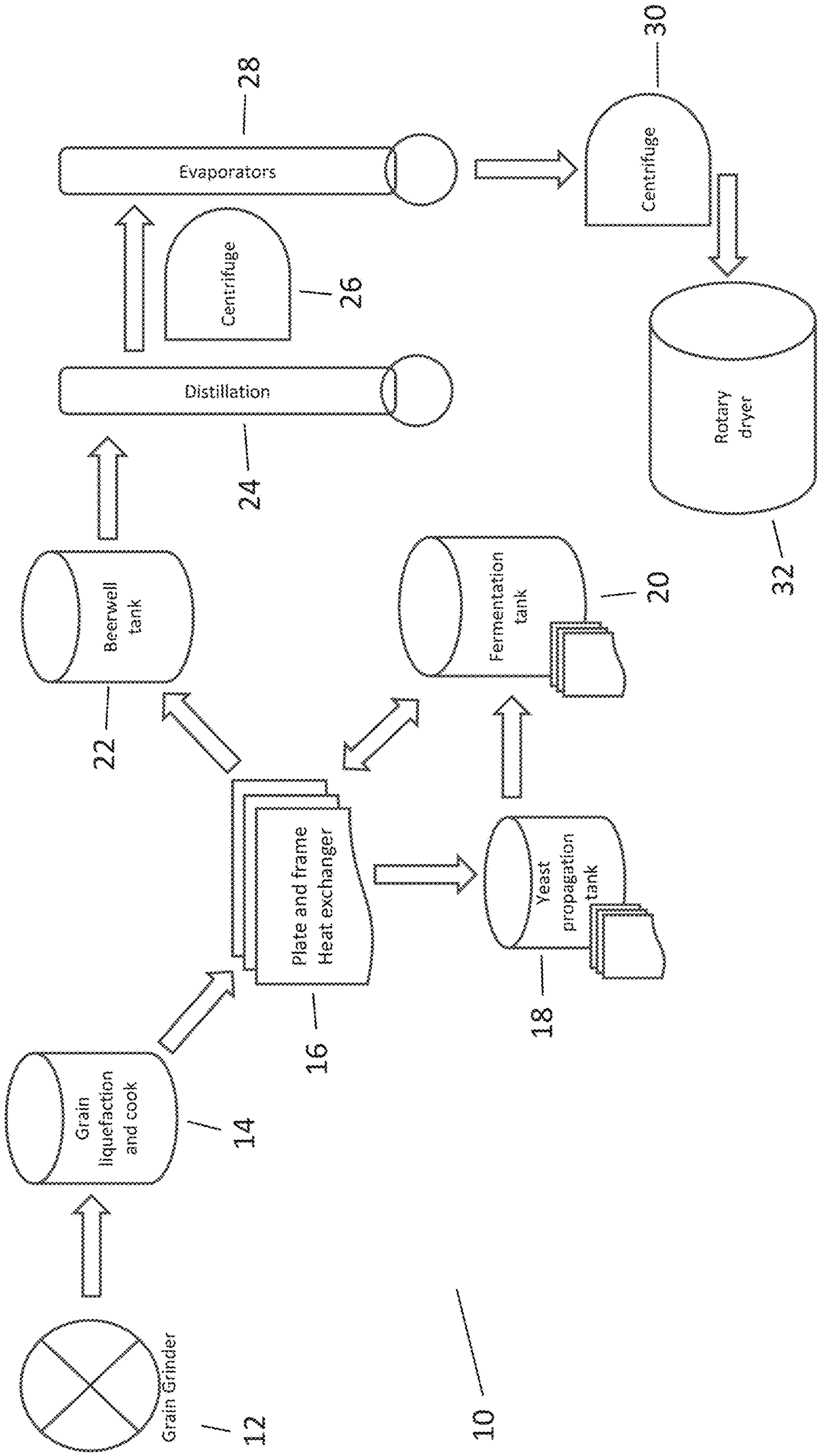
Grain Grinder
12
Grain liquefaction and cook
14
Plate and frame Heat exchanger
16
Yeast propagation tank
18
Fermentation tank
20
Beerwell tank
22
Distillation
24
Centrifuge
26
Evaporators
28
Centrifuge
30
Rotary dryer
32
10

ACIDIC CLEANER

CROSS-REFERENCE TO RELATED APPLICATION

This application is a continuation of application number 16/682,547 filed on Nov. 13, 2019, now U.S. Pat. No. 11,421,191, which claims the benefit of U.S. Provisional Application No. 62/767,797, filed Nov. 15, 2018, which is hereby incorporated by reference in its entirety.

BACKGROUND

In industrial facilities such as dairies, agricultural processing, food processing, breweries, biofuel production, and grain processing, manufacturing equipment becomes soiled with hard to remove carbohydrate, protein, mineral, fat, and oil soils. These industrial applications often operate for extended periods at high temperatures allowing soils to adhere to or crystalize on equipment surfaces, become thermally degraded, turn to mineral soils, or bake on to the equipment surface, often leaving complex compound residues that are challenging to remove.

Clean-in-place (or CIP) techniques are a cleaning regimen adapted for removing soil from the internal components of tanks, lines, pumps, and other processing equipment in industrial facilities. Clean-in-place cleaning involves passing cleaning solution(s) through the system without dismantling any system components. Traditional clean-in-place techniques are not always effective at removing difficult complex and compound soils. If clean-in-place cleaning is not effective, equipment operators may resort to dismantling the equipment in order to clean difficult soils manually. This is costly and time consuming. With certain equipment, it is not possible to dismantle the equipment and if the equipment cannot be cleaned, it must be replaced, which is also costly and time consuming.

It is against this background that the present disclosure is made.

SUMMARY

In one aspect, the present disclosure is directed to a method of cleaning industrial equipment in place at temperatures of 40° C. or higher using a composition having methane sulfonic acid and a pH less than 4. In addition to the methane sulfonic acid, the composition can further include organic and inorganic acids, and surfactants.

In another aspect, the present disclosure is directed to a method of cleaning industrial equipment in place at temperatures of 40° C. or higher using a composition having methane sulfonic acid, formic acid, phosphoric acid, a nitrogen-containing species, and a nonionic surfactant, and a pH of less than 4. The composition may further comprise an anionic surfactant.

In another aspect, the present disclosure is directed to a method of cleaning corn ethanol production equipment in place at temperatures of 40° C. or higher using a composition having methane sulfonic acid, formic acid, phosphoric acid, a nitrogen-containing species, and a nonionic surfactant, and a pH of less than 4. In addition, the method may include rinsing the equipment, applying an oxidizer, applying a sanitizer, or applying a caustic solution.

These and other embodiments will be apparent to those of skill in the art and others in view of the following detailed description. This summary and the detailed description illustrate only some examples and are not intended to be limiting to the invention as claimed.

BRIEF DESCRIPTION OF THE DRAWINGS

FIG. 1 shows a partial schematic of a corn ethanol plant.

DETAILED DESCRIPTION

The present disclosure is directed to methods for cleaning soils from hard surfaces using a clean-in-place process. The methods are especially useful in a biofuel plant such an ethanol plant. The methods include applying a composition having methane sulfonic acid to the equipment surface at high temperatures where the composition has a very low pH.

The term "about" is used in conjunction with numeric values to include normal variations in measurements as expected by persons skilled in the art, and is understood have the same meaning as "approximately" and to cover a typical margin of error, such as ±5% of the stated value.

Sodium hydroxide has been used as the traditional CIP cleaner in biofuel plants. But sodium hydroxide presents a number of challenges for industries that generate carbon dioxide as part of a fermentation process, like brewing and biofuel production. For example, in fermentation tanks that have been emptied for cleaning, carbon dioxide is hydrolyzed to carbonic acid in water vapor, which reacts with sodium hydroxide to form sodium bicarbonate and sodium carbonate. These are milder alkaline chemicals that are less effective as cleaners. This reaction also transforms gases into water vapor and ionic solutions, which risks creating vacuums and collapsing even large metal vessels. Additionally, in fermentation and post-treatment of beer, pH management is necessary to prevent bacterial growth and precipitation of mineral salts out of solution. When sodium hydroxide is used as the cleaner, the alkaline pH must be offset by adding in large quantities of a strong acid (e.g., sulfuric acid). This adds a significant cost to the overall process. Further, because the cleaning solution is frequently recycled into the fermentation process in biofuel fermentation, using sodium hydroxide adds significant sodium ions into the mash, which can suppress yeast activity. Finally, a sodium hydroxide program may not be effective at sanitizing fermentation lines.

The disclosed compositions have a very low pH and are more compatible for brewery and biofuel applications. For example, evacuation of carbon dioxide tanks can be avoided, multiple wash cycles can be avoided, lower levels of chemicals are used overall, implosion risks to equipment are avoided, and a lower overall sodium ionic strength is achieved.

It is unexpected that the present compositions are effective at cleaning biofuel plants and ethanol plants as part of a CIP program. Biofuel and ethanol plants differ from other CIP programs such as brewing or dairy CIP programs in important ways. For example, about 45-55% of the slurry used in a liquefaction tank is made from post-production dilute solution of soluble proteins, minerals, and other materials in water recycled from the end of the entire process. The recycled material, often called backset, is sourced from the aqueous phase of post-dilatation residues from the mash. Therefore, significant soils generated from polypeptides of denatured proteins, minerals, organic acids, most other water soluble materials and even some insoluble materials create a slurry mash that could foul to the production equipment during the initial cooking step and fermentation lines. Additionally, potential disruptions in the process can lead to different constituents in all mash for days.

Post-liquefaction facilities of a biofuel or ethanol process, such as fermentation tanks and yeast propagation tanks, are even more difficult to clean, compared with brewery facilities. In a brewing process, the liquefaction and cooking step is usually followed by lautering, filtration, or centrifuge to separate off the solids before fermentation. The brewery fermentation tank therefore contains mostly high carbohydrate syrups and is not heavily fouled. However, in the biofuel or ethanol process, no solid separation step is followed after the cooking step, and all soluble and insoluble solids pass into fermentation, leading to more soil compound and thicker film-deposits with higher fats, fibers, and proteins in the post-liquefaction facilities.

Notably, the unfavorable soil compound and film-deposits are chemically active, and are always changing during ethanol production. Particularly, in the presence of enzyme and concentrated liquid, the sugars and proteins may undergo uncontrollable chemical and biochemical reactions in short period of time, causing significant changes of physical and chemical properties of the soil and deposits in each equipment through the production stream.

Furthermore, the CIP systems in ethanol facilities are more rudimentary than those found in dairy or brewery facilities. The corresponding CIP process is also more rudimentary. Historically, in a CIP cleaning process, the yeast propagation tank and the ethanol fermentation tank are cleaned by a heated cleaning solution from a heated CIP tank connected to these facilities. Other facilities such as heat exchangers and evaporators are cleaned by unheated solutions from an unheated CIP tank. The cleaning process is therefore very limited because one CIP tank contains only one cleaning solution.

The traditional method of cleaning fuel ethanol facilities usually requires using a caustic solution such as 1-5% NaOH solution. However, considerable issues such as chemical compatibility and increased sodium residue may arise.

In addition, it is beneficial to clean fuel ethanol fermentation equipment using materials that are feed additive compatible as determined or qualified by the U.S. Food and Drug Administration (FDA) or third-party toxicological assessors.

The present compositions include methane sulfonic acid and, in some embodiments, additional organic and inorganic acids. The additional acids in the composition can be selected so that the composition is suitable for use in products that may have incidental contact with animal feed. This is useful because the waste streams from food, beverage, and biofuel plants may be desirable for use in feed additives but can only be used in feed additives if the chemicals in the waste stream are also suitable for use as feed additives, incidental contact with animal feed, indirect or direct contact with animal feed, or even themselves animal feed ingredients.

The disclosed compositions are typically provided to an operator as a concentrate to avoid shipping large amounts of water. Those concentrates are then fed into the clean-in-place system and circulated through the system with water. The amount of chemical that actually contacts the soil is diluted in the circulating water to form a use solution for contacting the equipment surface, usually ranging from 0.5 to 5% active.

In some embodiments, the concentrate composition has a pH of 2.0 or less, 1.5 or less, 1.0 or less, 0.5 or less, 0 or less, or -0.5 or less. In some embodiments, the use solution composition has a pH of 4.0 or less, 3.5 or less, 3.0 or less, 2.5 or less, 2.0 or less, 1.5 or less, or 1.0 or less. The pH can be achieved using methane sulfonic acid, organic acid, inorganic acid, or combinations thereof. In some embodiments, the acid is selected from the group consisting of sulfuric, nitric, methane sulfonic, phosphoric, formic, acetic, lactic, gluconic, propanoic, propionic, glycolic, salicylic, citric, succinic, malic, and combinations thereof.

Methane Sulfonic Acid

The composition includes methane sulfonic acid, alone or in combination with an organic or inorganic acid. Typically, the lower the pH of an acid, the more corrosive the acid is to metal surfaces. Methane sulfonic acid is an exception and has a low corrosion profile with stainless steel in spite of its very low pH. It also can be used in contact with a feed additive. And it is soluble and stable in aqueous solutions.

In some embodiments, the concentrate can include up to 50 wt. % methane sulfonic acid. In some embodiments, the concentrate includes from about 5 to about 40 wt. %, from about 10 to about 30 wt. %, or from about 10 to about 25 wt. % of methane sulfonic acid. The clean-in-place use solution can include from about 0.1 to about 6.0 wt. %, from about 0.2 to about 4.0 wt. %, or from about 0.3 to about 3 wt. % of methane sulfonic acid.

Organic Acid

In some embodiments, the composition includes an optional organic acid. Exemplary organic acids include mono-, di-, and tricarboxylic acids such as formic, butyric, valeric, caproic, itaconic, trichloroacetic, oxalic, terephthalic, citric, acetic, lactic, malonic, maleic, succinic, hydroxyl succinic, adipic, octanoic, fumaric, methacrylic, methylsulfamic, propionic, gluconic, glutamic, glutaric, benzoic, tartaric, hydroxyacetic, salicylic, and combinations thereof.

In some embodiments, the organic acid is not acetic or lactic acid. In some embodiments, the composition is free from acetic or lactic acid. In certain industries, acetic and lactic acid are used as markers for bacterial contamination because they are a byproduct of the bacteria's natural cellular processes. Including acetic or lactic acid in the composition may cause false positive results in systems testing for bacterial contamination.

In some embodiments, the organic acid is selected to be feed additive compatible. Examples of feed additive compatible organic acids include formic, butyric, valeric, caproic, oxalic, citric, acetic, lactic, octanoic, propionic, glutamic, tartaric, salicylic, and combinations thereof.

In some embodiments, the organic acid is selected to be food grade. Examples of food grade organic acids include formic, butyric, valeric, caproic, oxalic, citric, acetic, lactic, octanoic, propionic, glutamic, tartaric, salicylic, and combinations thereof.

In some embodiments, the organic acid is selected to provide antifungal, antimicrobial, or antiyeast properties. In biofuel, brewery, and cheese operations, it is important to ensure that only the desired bacterial or yeast microorganisms are found within the clean-in-place system and that wild-type bacteria or yeast are excluded.

In some embodiments, the organic acid is formic acid. Formic acid is desirable because it has antifungal and anti-wild-type yeast properties, is feed additive compatible, and is not a marker for bacterial activity.

In some embodiments, the concentrate can include up to about 20.0 wt. %, from about 0.1 to about 20.0 wt. %, from about 0.5 to about 15.0 wt. %, or from about 1 to about 10.0 wt. % of the organic acid. The clean-in-place use solution can include from about 0.0005 wt. % (5 ppm) to about 1 wt. %, from about 0.005 wt. % (50 ppm) to about 0.5 wt. %, or from about 0.01 wt. % (100 ppm) to about 0.25 wt. % of the organic acid.

Inorganic Acid

In some embodiments, the composition includes an optional inorganic acid. Exemplary inorganic acids include phosphoric, nitric, sulfuric, sulfamic, and combinations thereof.

In some embodiments, the inorganic acid is selected to be feed additive compatible. Examples of feed additive compatible inorganic acids include sulfuric, nitric, phosphoric, and sulfamic.

In some embodiments, the inorganic acid is selected to be food grade. Examples of food grade inorganic acids include sulfuric, nitric, and phosphoric.

In some embodiments, the inorganic acid is phosphoric acid. Phosphoric acid is desirable because it is not corrosive and is food grade and feed additive compatible.

In some embodiments, the concentrate can include up to about 20 wt. %, from about 1 to about 20 wt. %, from about 5 to about 15 wt. %, or from about 7 to about 12 wt. % of the inorganic acid. The clean-in-place use solution can include from about 0.005 wt. % to about 5.0 wt. %, from about 0.01 wt. % to about 3.0 wt. %, or from about 0.1 wt. % to about 1.0 wt. % of the inorganic acid.

Surfactant

In some embodiments, the composition optionally includes a surfactant. The surfactant may be nonionic, anionic, cationic, or amphoteric. The surfactant is preferably a nonionic surfactant. In some embodiments, the composition is free of anionic surfactant. In some embodiments, the surfactant or combination of surfactants is selected to generate a contact angle on a stainless steel surface at 30 seconds of less than 30 degrees, less than 15 degrees, or less than 5 degrees.

Nonionic Surfactants

In some embodiments, the surfactant comprises a nonionic surfactant. Nonionic surfactants improve soil removal and can reduce the contact angle of the solution on the surface being treated. Examples of suitable nonionic surfactants include alkyl-, aryl-, and arylalkyl-, alkoxylates, alkylpolyglycosides and their derivatives, amines and their derivatives, and amides and their derivatives. Additional useful nonionic surfactants include those having a polyalkylene oxide polymer as a portion of the surfactant molecule. Such nonionic surfactants include, for example, chlorine-, benzyl-, methyl-, ethyl-, propyl-, butyl- and other like alkyl-capped polyoxyethylene and/or polyoxypropylene glycol ethers of fatty alcohols; polyalkylene oxide free nonionics such as alkyl polyglycosides; sorbitan and sucrose esters and their ethoxylates; alkoxylated ethylene diamine; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and ethoxylated amines and ether amines and other like nonionic compounds. Silicone surfactants can also be used.

Examples of non-foaming, low foaming, or defoaming nonionic surfactants include block polyoxypropylene-polyoxyethylene polymeric compounds with hydrophobic blocks on the outside (ends) of the molecule, and nonionic surfactants modified by "capping" or "end blocking" terminal hydroxyl groups by reaction with a small hydrophobic molecule or by converting terminal hydroxyl groups to chloride groups. Other examples of non-foaming nonionic surfactants include alkylphenoxypolyethoxyalkanols; polyalkylene glycol condensates; defoaming nonionic surfactants having a general formula Z[(0410H]z where Z is alkoxylatable material (e.g., an alkyl, alkyl alcohol, alkyl amine), R is a radical, n is 10-2,000, and z is determined by the number of reactive functional groups capable of reacting with oxygen; and conjugated polyoxyalkylene compounds.

Preferred nonionic surfactants include alkyl alcohol alkoxylates, especially alkyl alcohol alkoxylates that are capped with propylene oxide, and ethylene oxide/propylene oxide copolymers and reverse copolymers. Preferred surfactants have a carbon chain with 8 to 18 carbons. The following are preferred surfactants:

- Surfactant A having the following formula: R1-O-(EO $)_{x3}$(PO$)_{y3}$—H, wherein R1 is a straight-chain C10-C16-alkyl, and wherein x3=5-8, preferably 5.5-7, and wherein y3=2-5, preferably 2-3.5;
- Surfactant A2 having the following formula: R1—O-(EO$)_{x4}$(PO$)_{y4}$ -H, wherein R1 is a straight-chain C10-C16-alkyl, and wherein x4=4-8, preferably 4-5.5, and wherein y4=2-5, preferably 3.5-5;
- Surfactant B having the following formula: R2-O—(EO$)_{x1}$—H, wherein R2 is a C10-C14 alkyl, or preferably a C12-C14 alkyl, with an average at least 1 branch per residue, or preferably at least 2 branches per residue, and wherein x1=5-10;
- Surfactant C having the following formula: R2-O—(EO$)_{x2}$—H, wherein R2 is a C10-C14 alkyl, or preferably a C12-C14 alkyl with an average at least 1 branch per residue, or preferably at least 2 branches per residue, and wherein x2=2-4;
- Surfactant D having the following formula: R7-0—(PO$)_y$5 (EO$)_{x5}$(P0$)_y$6, wherein R7 is a C8-C16 Guerbet alcohol, preferably a C8-12 Guerbet alcohol, or more preferably a C8-C10 Guerbet alcohol, wherein x5=5-30, preferably 9-22, wherein y5=1-5, preferably 1-4, and wherein y6=10-20;
- Surfactant E having the following formula: R6-0—(PO$)_{y4}$ (EO$)_{x4}$, wherein R6 is a C8-C16 Guerbet alcohol, preferably a C8-12 Guerbet alcohol, or more preferably a C8-C10 Guerbet alcohol, wherein x4=2-10, preferably 3-8, wherein y4=1-2; and
- Surfactant F having the following formula: R7—O—(EO)x3(PO)y5(EO)x4, wherein R7 is a C8-C16 Guerbet alcohol, preferably a C8-12 Guerbet alcohol, or more preferably a C8-C10 Guerbet alcohol, wherein x3=3-10, preferably 4-6, wherein y5=4-10, preferably 4-6, and wherein x4=1-10, preferably 1-5; any combination of one or more of Surfactants A, A2, B, C, D, or E.

In some embodiments, the surfactant has a structure of $R^1$-O—(EO)x3(PO$)_y$3 -H where le has 10-16 carbon atom, x3 is 5.5-7, and y3 is 2-3.5.

Anionic Surfactants

The composition may include one or more anionic surfactants. Suitable anionic surfactants for the present composition include: carboxylic acids and their salts, such as alkanoic acids and alkanoates, ester carboxylic acids (e.g. alkyl succinates), ether carboxylic acids, and the like; phosphoric acid esters and their salts; sulfonic acids and their salts, such as isethionates, alkylaryl sulfonates, alkyl sulfonates, sulfosuccinates; and sulfuric acid esters and their salts, such as alkyl ether sulfates (e.g., sodium lauryl ether sulfate), alkyl sulfates (e.g., linear alkyl sulfates, sodium lauryl sulfate), and the like. In some embodiments, it may be beneficial to use an anionic surfactant together with a nonionic surfactant for foam control where the nonionic surfactant is used above its cloud point.

Cationic Surfactants

Examples of suitable cationic surfactants include amines, such as alkylamines and their salts, alkyl imidazolines, ethoxylated amines, and quaternary ammonium compounds and their salts. Other cationic surfactants include sulfur (sulfonium) and phosphorus (phosphonium) based compounds that are analogous to the amine compounds.

Amphoteric and Zwitterionic Surfactants

Amphoteric and zwitterionic surfactants include lecithin and its derivatives and salts, derivatives of secondary and tertiary amines, derivatives of heterocyclic secondary and tertiary amines, or derivatives of quaternary ammonium, quaternary phosphonium or tertiary sulfonium compounds. The ammonium, phosphonium, or sulfonium compounds can be substituted with aliphatic substituents, e.g., alkyl, alkenyl, or hydroxyalkyl; alkylene or hydroxy alkylene; or carboxylate, sulfonate, sulfate, phosphonate, or phosphate groups. Betaine and sultaine surfactants are exemplary zwitterionic surfactants for use in the present composition.

In some embodiments, the concentrate can include up to about 5.0 wt. %, from about 0.01 to about 5.0 wt. %, from about 0.05 to about 4.0 wt. %, or from about 0.1 to about 3.0 wt. % of the total surfactant. The clean-in-place use solution can include from about 0.0001 wt. % to about 1.0 wt. % from about 0.0005 wt. % to about 0.5 wt. %, or from about 0.001 wt. % to about 0.1 wt. % of surfactant.

Additional Materials

The compositions may comprise additional materials to provide desired properties or functionality. For example, the compositions can include builders, solvents, sanitizers or antimicrobial agents, preservatives, corrosion inhibitors, anti-redeposition agents, fluorescing materials, or other functional ingredients. In some embodiments, additional materials are selected to be compatible with feed additives or are considered food grade or generally recognized as safe.

Builders

The compositions may optionally include one or more builders. Builders include chelating agents (chelators), sequestering agents (sequestrants), detergents, and the like. Builders can be used to stabilize the composition or solution. Examples of suitable builders include phosphonic acids and phosphonates, phosphates, aminocarboxylates and their derivatives, pyrophosphates, polyphosphates, ethylenediamine and ethylenetriamine derivatives, hydroxyacids, and mono-, di-, and tri-carboxylates and their corresponding acids. Still other builders include aminocarboxylates, including salts of N,N-dicarboxymethyl glutamic acid (GLDA), methylglycinediacetic acid (MGDA), ethylenediaminetetraacetic acid (EDTA), hydroxyethylenediaminetetraacetic acid (HEDTA), and diethylenetriaininepentaacetic acid. Preferred builders are water soluble. Particularly preferred builders include EDTA (including tetra sodium EDTA), TKPP (tripotassium polyphosphate), PAA (polyacrylic acid) and its salts, polyacrylic/polymaleic acid and its salts, and sodium gluconate.

The concentrate compositions may include about 0.05 to about 7 wt-%, about 0.1 to about 5 wt-%, about 0.2 to about 4 wt-%, about 0.3 to about 3 wt-%, or about 0.5 to about 2 wt-% of a builder.

Solvents

The compositions may optionally include one or more organic solvents. Suitable solvents include organic solvents, such as, esters, ethers, ketones, amines, mineral spirits, aromatic solvents, non-aromatic solvents, and nitrated and chlorinated hydrocarbons. Preferred solvents include water soluble materials like glycerine, propylene glycol, urea, ethanol, propanol, butanol, short chain fatty acids, ethanol, and amines.

Sanitizers, Antimicrobial Agents, and Preservatives

The compositions may optionally include a sanitizer, antimicrobial agent, or preservative. Suitable sanitizers, antimicrobials, and preservatives include fatty acids, organic acids, anionic surfactants, iodine-based sanitizers, quaternary ammonium compounds, chlorine dioxide, acidified sodium chlorite, hydrogen peroxide, and organic peroxides.

Corrosion Inhibitors

The compositions may optionally include a corrosion inhibitor. The equipment in industrial facilities is typically made out of stainless steel and subject to corrosion. Examples of suitable corrosion inhibitors include quaternary ammonium salts, betaines, pyridine, pyridine carboxylic acids, $C_{12}$ to $C_{18}$ fatty acids (saturated and unsaturated), fatty acid esters, sugar esters, tannic acid and salts, polyphosphoric acid and salts thereof, phosphoric acid and salts thereof, phospholipids, phosphate ester, carboxylic acids, tocopherol, polygalacturonic acid (pectic acid), alkyl alcohol ethoxylates.

Anti-Redeposition Agents

The composition may optionally include an anti-redeposition agent capable of facilitating sustained suspension of soils in a cleaning solution and preventing the removed soils from being redeposited onto the equipment being cleaned. Examples of suitable anti-redeposition agents include fatty acid amides, complex phosphate esters, polyvinyl alcohol, polyethylene glycol, xanthan gum, and cellulosic derivatives such as hydroxyethyl cellulose, hydroxypropyl cellulose, hydroxymethylcellulose, and the like.

The concentrate can include an anti-redeposition agent in an amount of about 0.5 wt. % to about 10 wt. %, and about 1 wt. % to about 5 wt. %.

Fluorescing Materials

The cleaning composition may optionally include a fluorescing material to serve as an inert tracer such that the tracer's concentration can be correlated to the concentration of the cleaning composition and inform the operator if the cleaning composition concentration needs to be increased or decreased. Exemplary tracers include 3,6-acridinediamine, N,N,N',N'-tetramethyl, monohydrochloride; 2-anthracenesulfonic acid sodium salt; 1,5-anthracenedisulfonic acid; 2,6-anthracenedisulfonic acid; 1,8-anthracenedisulfonic acid; anthra[9,1,2-cde]benzo[rst]pentaphene-5,10-diol, 16,17-dimethoxy-,bis(hydrogen sulfate), disodium salt; bathophenanthrolinedisulfonic acid disodium salt; amino 2,5-benzene disulfonic acid; 2-(4-aminophenyl)-6-methylbenzothiazole; 1H-benz[de]isoquinoline-5-sulfonic acid, 6-amino-2,3-dihydro-2-(4-methylphenyl)-1,3-dioxo-, monosodium salt; phenoxazin-5-ium, laminocarbonyl)-7-(diethylamino)3,4-dihydroxy-, chloride; benzo[a]phenoxazin-7-ium, 5,9-diamino-, acetate; 4-dibenzofuransulfonic acid; 3-dibenzofuransulfonic acid; 1-ethylquinaldinium iodide; fluorocein; fluorescein, sodium salt; Keyfluor White ST; benzenesulfonic acid, 2,2'-(1,2-ethenediyl)bis[54[44bis (2-hydroxyethyl)amino]-6-[(4-sulfophenyl)amino]-1,3,5-triazin-2-yl]amino]—, tetrasodium salt; C.I. Florescent Brightener 230; benzenesulfonic acid, 2,2'-(1,2-ethenediyl) bis[5-[[44bis(2-hydroxyethyl)amino]-6-[(4-sulfophenyl) amino]-1,3,5-triazin-2-yl]amino], tetrasodium salt; 9,9'-biacridinium, 10,10'-dimethyl-, dinitrate; 1-deoxy-1-(3,4-dihydro-7,8-dimethyl-2,4-dioxobenzo[g]pteridin-10(2H)-yl)-ribitol; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl) bis[5-(4-phenyl-2H-1,2,3-triazol-2-yl), dipotassium salt; benzenesulfonic acid, 5-(2H-naphtho[1,2-d]triazol-2-yl)-2 (2-phenylethenyl)-, sodium salt; 1,3,6,8-pyrenetetrasulfonic acid, tetrasodiun salt; pyranine; quinoline; 3H-phenoxazin-3-one, 7-hydroxy-, 10-oxide; xanthylium, 9-(2,4-dicarboxyphenyl)-3,6-bis(diethylamino)-, chloride, disodium salt; *phenazinium,* 3,7-diamino-2,8-dimethyl-5-phenyl-, chloride; C.I. Fluorescent Brightener 235; benzenesulfonic acid, 2,2'-(1,2-ethenediyl)bis[5-[[44bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis [54[44(2-hydroxypropyl)amino]-6-(phenylamino)-1,3,5-triazin-2-yl]amino]-, disodium salt; xanthylium, 3,6-bis (diethylamino)-9-(2,4-disulfophenyl)-, inner salt, sodium salt; benzenesulfonic acid, 2,2'-(1,2-ethenediyl)bis[5-[[4-Raminomethyl)(2-hydroxyethyl)amino]-6-(phenylamino)-1,3,5-triazin-2-yl]amino]-, disodiun salt; Tinopol DC S; benzenesulfonic acid, 2,2'-([1,1'-biphenyl]-4,4'-diyldi-2,1-ethenediyl)bis, disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof, wherein said components of said mixtures are selected such that the fluorescent signals of the individual inert fluorescent tracers within the mixture are capable of being detected. The use of fluorescent tracers in clean-in-place systems is described in US Patent Publication 2006/02866676, which is incorporated herein by reference in its entirety.

In some embodiments, the composition is limited to certain materials in order to provide a composition that is food grade, feed additive compatible, low corrosion, low foaming, antifungal, and anti-wild type yeast. Such compositions consist essentially of methane sulfonic acid, formic acid, phosphoric acid, nonionic surfactant, and optionally anionic surfactant together with optional additional materials. In some embodiments, the composition is limited to materials that consist of methane sulfonic acid, formic acid, phosphoric acid, nonionic surfactant, and optionally anionic surfactant together with optional additional materials.

Methods of Cleaning

The compositions typically contact the equipment surface as a result of being pumped through clean-in-place equipment along with a large amount of water. In some embodiments, the compositions can be applied to the equipment surface by circulating the compositions through the clean-in-place equipment, spraying, impingement, flowing, or soaking. In some embodiments, the composition is in contact with the equipment surface for at least 20 s, 30 s, 40 s, 50 s, 60 s, 90 s, 2 min, 2 min 30 s, 3 min, 4 min, or 5 min or longer, and/or no more than 120 min, 60 min, 30 min, 25 min, 20 min, 15 min, 10 min, 8 min, 7 min, 6 min, 5 min, 4 min, 3 min, 2 min 30 s, or 2 min. The composition can contact the equipment surface for 5 to 120 minutes, 10 to 60 minutes, or 20 to 30 minutes.

In some embodiments, the disclosed acid compositions can be used as part of a broader cleaning regimen along with other steps. A cleaning regimen can include water rinses including pre- and post-cleaning rinses. The regimen can include multiple cleaning cycles using the acid composition. For example, in one embodiment, the equipment is pre-cleaned with the acid composition as the equipment is being drained, followed by a water rinse, and then a second cleaning cycle with the acid composition. The regimen can include multiple cleaning steps using the acid composition in combination with other compositions including sodium hydroxide. In some embodiments, it may be beneficial to do a periodic alkaline cleaning cycle using sodium hydroxide, sodium carbonate, or sodium bicarbonate instead of the disclosed acid compositions. Such periodic sodium hydroxide cycles can happen once a week, once every other week, once a month, once every other month, once every six months, or any time that additional cleaning would be beneficial. A periodic alkaline cycle can have from 0 to 10 wt. % actives in it and a temperature of 40° C. to 95° C. In addition to rinses and cleaning cycles, the regimen can include sanitizing cycles with an antimicrobial agent or oxidizing cycles with an oxidizing agent. Suitable oxidizers include hydrogen peroxide, organic peroxides including performic, peracetic acid, and peroctanoic acids. Suitable sanitizers include fatty acids, organic acids, anionic surfactants, iodine-based sanitizers, quaternary ammonium compounds, chlorine dioxide, acidified sodium chlorite, hydrogen peroxide, and organic peroxides.

In some embodiments, the method of cleaning is free from cleaning with an alkaline composition such as sodium hydroxide, sodium carbonate, sodium bicarbonate, and the like. In some embodiments, the method incorporates an alkaline composition such as sodium hydroxide, sodium carbonate, or sodium bicarbonate.

The compositions contact the equipment surface at an elevated temperature of 40° C. or higher, 45° C. or higher, 50° C. or higher, 55° C. or higher, 60° C. or higher, 65° C. or higher, 70° C. or higher, 75° C. or higher, 80° C. or higher, 85° C. or higher, 90° C. or higher, 95° C. or higher, or 100° C. or higher.

Applications

The compositions and methods are useful in clean-in-place applications in the dairy, cheese, sugar, oil processing, beverage, brewery, food manufacturing, industrial agriculture, biofuel and ethanol industries. These industries have challenging soils such as dairy soils, concentrated food soils like fructose or corn syrup, beer stone and brewing and fermentation residues, soils generated in sugar beet and cane processing, and soils generated in condiment and sauce manufacturing (e.g., ketchup, tomato sauce, barbeque sauce). In some embodiments, the compositions and methods can also be used to clean equipment manually or "out of place" where the equipment is dismantled as part of cleaning.

Examples of equipment include pasteurizers, evaporators, heat exchangers (e.g., tube-in-tube heat exchangers, direct steam injection, and plate-in-frame exchangers, mash or beer heat exchangers), heating coils (e.g., steam, flame, or heat transfer fluid), re-crystallizers, pan crystallizers, spray dryers, drum dryers, tanks, fermentation tanks, storage tanks, vats, and filling lines. In some embodiments, the compositions and methods are used specifically in cleaning corn ethanol biofuel production equipment including yeast propagation systems, corn fermentation systems, liquefaction and cooking systems, corn mash and beer storage, plate and frame heat exchangers, waste heat recovery exchangers, shell and tube heat exchangers, helical coil exchangers, reboilers, transport piping, tanks and vessels, agitation blades, bars, and baffles, pumps, jet cookers, automated and manual valves, separators and centrifuges, filters and membranes, distillation columns and plates, evaporation columns, tubing and tube chests, and rotary driers.

FIG. 1 shows a schematic of a corn ethanol plant generally 10. Corn is ground into small pieces at the grinder 12 and then cooked in tank 14 to convert the starches in the corn to sugar. The cooked corn mash is cooled through a heat exchanger 16 and sent to a fermentation tank 20 where yeast is added from the yeast propagation tank 18 to the fermentation tank 20 to convert the sugars in the corn mash to ethanol. The ethanol in the fermentation tank 20 is sent through the heat exchanger 16 again and to the beerwell tank 22 where it passes through a series of distillation columns 24, centrifuges 26 and 30 and evaporators 28 to separate the ethanol from the remaining solids. The solids are eventually sent to a rotary dryer 32 for drying before they are shipped for further use, such as animal feed. The equipment in FIG. 1 is typically cleaned using a clean-in-place process and the disclosed compositions can be used to clean any of this equipment. The heat exchanger 16, yeast propagation tank 18, fermentation tank 20, distillation column 24, centrifuges 26 and 30 and the evaporator 28 in particular would benefit from the disclosed compositions and methods.

In some embodiments, the disclosed compositions do not generate any foam or generate foam that immediately collapses. In clean-in-place systems, excessive foaming can cause overflow of chemical day tanks, product loss, risk injuries to employees, and reduce effectiveness.

EXAMPLES

Example 1: Acid cleaner screening test

Effectiveness Measurement Test Method:

Various acid cleaner formulations were tested and the results are shown in Table 1. The test method used was the Cleanliness Measurement Test Method described in Example 2. The percent soil removed was visually evaluated by comparing the coupons after cleaning with coupon standards indicating 0% soil removal and 100% soil removal. The presence of oily film was observed visually because the oil formed a small droplet on the coupon after cleaning. The protein film was also observed visually because it formed a thin white crust on the coupon.

All acid cleaners are generally effective compared with water, with cleanliness of 80% or higher. Acid cleaners having a low pH value (<1.85) are generally effective in removing protein film, however, obvious oily film could still be found after cleaning. Comparatively, acid cleaners having a moderate pH value (1.85-3.0) are effective in removing oily film but not protein film. The conventional cleaner, NaOH caustic solution, was used as a control and was effective in cleaning corn mash soil. Two water controls were also tested.

TABLE 1

Acid cleaner formulations and effectiveness.

| Test | NaOH 50% | Phos. Acid 75% | MSA | Formic acid 85% | Sulfamic acid | Lactic acid 88% | Citric acid | pH before test | Temp C. ° | % soil removed after cleaning | Protein film | Oily film |
|---|---|---|---|---|---|---|---|---|---|---|---|---|
| 1 | | | | | 17.5 | | | 0.87 | 45 | 90% | no | yes |
| 2 | | | 6.5 | | | | | 0.95 | 45 | 95% | no | yes |
| 3 | | | 5.6 | 8 | | | | 1 | 45 | 95% | no | yes |
| 4 | | | 6.5 | | | | | 1 | 45 | 90% | no | yes |
| 5 | | | | | 6.5 | | | 1.1 | 45 | 95% | little | yes |
| 6 | | 20 | | | | | | 1.2 | 45 | 95% | no | yes |
| 7 | | 20 | | | | | | 1.2 | 45 | 80% | little | yes |
| 8 | | 10 | | | | | | 1.34 | 45 | 80% | yes | yes |
| 9 | | | 1.3 | 8 | | | | 1.5 | 45 | 95% | little | yes |
| 10 | | | | 8 | | | | 1.5 | 45 | 90% | yes | no |
| 11 | | | | 17.4 | | | | 1.82 | 45 | 90% | little | yes |
| 12 | | | | | | | 15 | 1.82 | 45 | 90% | yes | yes |
| 13 | | | 0.51 | | | | | 1.95 | 45 | 95% | yes | no |
| 14 | | | | 8 | | | | 1.96 | 45 | 95% | yes | no |
| 15 | | | | | | 10.76 | | 2 | 45 | 80% | yes | no |
| 16 | | 1.06 | | | | | | 2 | 45 | 95% | yes | no |
| 17 | | | | 0.35 | | | | 2.5 | 45 | 95% | yes | no |
| 18 | | | 7 | | | | | 2.5 | 50 | 95% | yes | no |
| 19 | | | | 0.8 | | | | 3 | 45 | 90% | little | no |
| Water 1 | | | | | | | | 5.2 | 50 | 75% | yes | no |
| Water 2 | | | | | | | | 5.2 | 45 | 80% | yes | no |
| NaOH | 6 | | | | | | | 13.3 | 45 | 95% | no | no |

Example 2: Acid cleaners containing Surfactant A

Cleanliness Measurement Test Method:

This test analyzed the relative effectiveness of acid cleaners with the addition of Surfactant A: R1-O-$(EO)_{x3}(PO)_{y3}$—H, wherein R1 is a straight-chain $C_{10}$-$C_{16}$-alkyl, and wherein x3=5-8, preferably 5.5-7, and wherein y3=2-5, preferably 2-3.5. The compositions were tested by evaluating the whole corn soil removal from stainless steel surfaces using acid cleaners with surfactants according to the instant disclosure. In general, stainless steel coupons were soiled by corn mash, and then were cleaned by acid cleaners of interest. Water was used as a control cleaner. The cleanliness of the tested coupons were measured by reflectance using a gloss meter and normalized against water.

Brand new stainless steel 304 or 316 coupons (2×4 inch) were cleaned by the following steps. First, the adhesive sticker, if any, was removed from the stainless steel coupon, and residual adhesive, if any, was removed by wiping with acetone and Kimwipes. The coupons were then cleaned through dishwasher with standard detergent, rinsed with DI water, and dried overnight.

Soil was prepared by the following steps. The corn mash obtained from a field account was poured into a Bullet brand blender and blended for about 10 min. The blended corn mash was then divided and transferred into individual specimen cups (about 1/4 full in each cup). The specimen cups were kept frozen before use.

The soiling of coupons were performed by the following steps. A new container of whole corn mash was prepared on a stir plate to stir continuously with a stir bar. A mark was drawn on each stainless steel coupon about one inch from the top by a permanent marker. Each stainless steel coupon was numbered above the permanent mark, and the soiling was allowed to occur only below the mark. The initial mass of each stainless steel coupon was recorded. The marked coupon was tared and added on its surface a sample of prepared corn mash (about 0.6 g) using a pipette. The soil was spread using a sponge brush in the soil area of the coupon. Excessive mash was brush off in an even top to bottom vertical brush stroke until 0.10-0.13 g of soil remained on the surface. The exact mass of the soil was recorded. The soiled coupon was placed on a tray flat to dry for 1 hour. A second layer of soil in the same fashion at 0.10-0.13 g (total of 0.2-0.26 g for both layers) was applied. The soil was allowed to dry for a 24-hour period before cleaning. The total weigh of prepared coupon was recorded.

The cleaning process, including a "wash step" with the acid cleaner of interest and a "post spray step" with DI water in a trigger sprayer bottle, was performed as follows. The temperature of hotplates were set to 60° C., and the speed rate was set at 200 rpm. Each acid cleaner of interest (350 mL) was placed into its designated 600 mL-beaker on the hot plate. A 1-inch stir bar was placed into each beaker, and the acid cleaner was kept stirring. The temperature of each beaker was monitored by a thermometer probe placed therein. Four soiled stainless steel coupons were randomly selected and their numbers were recorded. Once the target temperature was reached, the selected coupons were added to the acid cleaner beakers to soak for 10 min. The coupons were then removed and held above a plastic container towards one end. DI water was sprayed 8 times to the further clean the coupon from about 1 foot distance using a trigger sprayer containing DI water. An extra rinse under a gentle faucet of water was performed for any cleaners containing caustic solution. The cleaned coupons were dried.

Cleanliness of the tested coupon was measured using a BYK Micro-TRI-Gloss Meter. The gloss meter was placed on the coupon in the direction of the grain. Measurements were taken in triplicate across the coupons and were averaged. The degree of gloss is measured using the 60-degree angle data. A higher gloss value indicates less soiling on the stainless steel surface, and therefore, better performance. The cleanliness of each cleaner was normalized to water.

The formulation and effectiveness of various acid cleaners were summarized in Table 2. Apparently, all acid cleaners having Surfactant A (50 ppm) are significantly more effective as compared with their respective control. It is important to note that surfactants play a critical role in the cleaning performance of acid cleaners.

TABLE 2

Formulation and effectiveness of acid cleaners having Surfactant A.

| Acid solution (pH = 2) | Surfactant A (0 ppm) Normalized cleanliness to water | Surfactant A (50 ppm) Normalized cleanliness to water |
|---|---|---|
| MSA/Nitric acid | 1.06 | 1.84 |
| Formic acid | 1.19 | 1.95 |
| Phosphoric acid | 1.15 | 1.96 |
| Sulfuric acid | 1.11 | 1.86 |
| Nitric acid | 1.11 | 1.90 |
| Citric acid | 1.12 | 1.89 |
| MSA | 1.14 | 1.88 |
| MSA/Formic acid | 1.12 | 1.98 |
| MSA/Phosphoric acid | 1.14 | 1.93 |

Example 3: Acid cleaners containing different surfactants

Acid Blends 1 and 2 were prepared according to the formulations provided in Tables 3 and 4, respectively. Cleaner solutions comprising Acid Blend 1 and various surfactants were prepared and evaluated by the Cleanliness Measurement Test Method described in Example 2. The results are summarized in Table 5. It is notable that nonionic surfactants Surfactant A, Surfactant E, and Surfactant F are generally effective to boost the cleaning; however, anionic surfactant such as SLS does not improve the cleaning performance as compared with water.

TABLE 3

Formulation of Acid Blend 1.

| Raw Material | Wt % |
|---|---|
| DI Water | 76.3 |
| Urea prilled | 0.1 |
| Lutropur M | 14.5 |
| Nitric acid (67-70%) | 8 |
| Citric acid | 1.1 |
| Total | 100 |

TABLE 4

Formulation of Acid Blend 2.

| Raw Material | Wt % |
|---|---|
| DI Water | 52.4 |
| Phosphoric Acid (75%) | 6.8 |
| Lutropur M | 30 |
| Formic acid (90%) | 5.7 |
| Urea prilled | 5.1 |
| Total | 100 |

TABLE 5

| Cleaning efficacy of Acid Blend 1 with various surfactants | |
|---|---|
| Acid cleaner formulation | Normalized cleanliness to water |
| Acid Blend 1 + 50 ppm Surfactant A | 1.38 |
| Acid Blend 1 + 50 ppm Surfactant A + 50 ppm SLS | 0.92 |
| Acid Blend 1 + 50 ppm Surfactant F | 1.29 |
| Acid Blend 1 + 50 ppm Surfactant E | 1.26 |
| Acid Blend 1 + 50 ppm SLS | 0.74 |

Example 4: Acid cleaners with different concentrations of surfactant

Cleaner solutions comprising Acid Blend 1 and various ppm level of surfactant were prepared and evaluated following the Cleanliness Measurement Test Method described in Example 2. As shown in Table 6, the optimal level of surfactant is 50 ppm, which resulted in the best cleanliness. By contrast, Acid Blend 1 with 20 ppm surfactant was close to water. A surfactant concentration over 100 ppm was better than water but not as good as 50 ppm surfactant.

TABLE 6

| Acid cleaners with different ppm levels of Surfactant A surfactant. | | |
|---|---|---|
| Acid solution | Surfactant A (ppm) | Normalized cleanliness to water |
| Acid Blend 1 | 20 | 1.01 |
| Acid Blend 1 | 50 | 1.4 |
| Acid Blend 1 | 100 | 1.2 |
| Acid Blend 1 | 500 | 1.2 |

Example 5: Degraded/expired soil test

Because soil used in cleaning test is susceptible to storage condition and aging, several acid cleaners were also evaluated in removing degraded or expired soils from soiled stainless steel coupons following the same Cleanliness Measurement Test Method described in Example 2. The results are summarized in Table 7. The aged soil gave large inconsistencies in cleaning results. For example, 3% NaOH caustic solution, became even less effective than water in cleaning the aged soil, as compared with its high efficacy in cleaning the fresh soil shown in Table 1. While not wanting to be bound by theory, it is believed that the soil undergoes substantial changes in composition over time due to ongoing enzyme activity, evaporation of ethanol, and decomposition of the soil that makes it more difficult to clean.

TABLE 7

| Effectiveness of acid cleaners in removing degraded/expired soil. | |
|---|---|
| Cleaner solution | Normalized cleanliness to water |
| 3% NaOH solution | 0.87 |
| Acid Blend 1 + 50 ppm Surfactant F | 0.97 |
| Acid Blend 1 + 50 ppm Surfactant E | 1.01 |

Example 6: Multi-Cycle Post Caustic Wash Test after 3 Cycles of Resoiling/Cleaning Example 6 used either the Cleanliness Measurement Test Method from Example 2 or the Cleanliness Measurement by Image Analysis method described below.

Cleanliness Measurement by Image Analysis: This test method is similar to the Cleanliness Measurement Test Method described in Example 2. Preparation of stainless steel coupons and soils remained the same. The cleaning process was slightly modified. A hot plate was designated to water and other hot plates to acid cleaners. The hot plate designated to water was set at 30° C. and the hot plates for acid cleaners at 60° C. The speed rate of all hot plates were set at 200 rpm. Each acid cleaner subject to the test (350 mL) was placed into its designated 600 mL-beaker on the hot plate. A $1^1/_2$inch stir bar was placed into each beaker, and the acid cleaner was allowed to stir. DI water (approximately 350 mL) and a 1½ inch stir bar were then placed in a 600-mL beaker on its designated hotplate. The temperature of each beaker was monitored by a thermometer probe placed therein. Four soiled stainless steel coupons were randomly selected and their numbers were recorded. The selected coupons were added to the DI water beaker to soak for 5 min, and then were removed therefrom. The water soaked coupons were then placed into the acid cleaner beaker to soak for 5 min. Photo of coupons were taken between the water soak and the acid cleaner soak. The coupons were taken out, cleaned by running DI water to remove the residual acid cleaner solution, and dried overnight. The soiling and cleaning steps were repeated using the same coupon set until three cycles (a total of three cleanings) were completed. The coupons were placed in a 3% NaOH caustic solution at 60° C. for 5 minutes for a final wash. The coupons were then placed in DI water for 5 minutes at 30° C. to remove any residual cleaner chemistry, and dried over night before analysis.

The image analysis was performed by using FIJI/ImageJ software following the procedures below. Coupon images were scanned using a color and grey scale. A grey scale jpeg file is used for this image analysis evaluation. A threshold value of 90 was set for soil removal analysis. The total threshold range was set from 0 to 255, where a value of 0 reads all black pixels and a value of 255 reads all white pixels on the coupon. A threshold value of 90 was set to maximize the dynamic range across the formulas in the result analysis. This value allowed for a clean stainless steel coupon to have no measured soil using image analysis and any soiled coupon to have 100% soil. Once the threshold value was set, a standard area was selected and the area was measured for percent soiling. Formulations with a higher percent clean across the coupon denote improved performance. The area, standard deviation, min, max, median, and % area of soil removal were subsequently measured and recorded. The raw data was further analyzed in Minitab, Microsoft Excel, or other statistics program.

Various cleaners were prepared and tested. As shown in Table 8, the conventional caustic cleaner (3% NaOH) became less effective when continuously cleaning resoiled test coupons. Acid Blend 2 without surfactant also has a lower cleanliness than water does. By contrast, acid cleaner comprising Acid Blend 2 and surfactant performs much better than water and all others, with 46.68% cleanliness after three cycles of soiling-cleaning. These results indicate the importance of surfactant in acid cleaners to continuously clean resoiled equipment and the benefit of including a periodic caustic wash.

TABLE 8

| Cleanliness after three cycles of soiling-cleaning test. Multi-cycle cleaning test | | |
|---|---|---|
| Cleaner solution | Reflectance | % cleanliness after final caustic wash |
| 3% NaOH solution | 230.5 | 13.97 |
| Acid Blend 2 + Surfactant A | 262 | 46.68 |
| Acid Blend 2 (no surfactant) | No data | 11.77 |
| DI water | 247 | 17.73 |

Example 7: Contact angle test

Contact Angle Test Method: Contact angle measures the wettability of a liquid on a substrate. In this present disclosure, contact angle was measured at either room temperature or elevated temperature, using Attention Theta obtained from Biolin Scientific. Contact angle measurement at room temperature was performed as follows: Samples were prepared and loaded individually into the application tip for the dispenser; the substrate of choice was placed on the platform in view of the camera; settings for droplet size, test duration, and framerate were selected, a test was run and saved in the program. Contact angle measurement at elevated temperature was performed as follows: Samples were prepared and loaded individually into the application tip for the dispenser; the temperature environmental chamber was placed on top of the platform in view of the camera with the substrate inside; a thermocouple was placed inside the chamber and the decided temperature was selected in the program setup; settings for droplet size, test duration, and framerate were selected; and the test was run and saved in the program. During contact angle measurement, a new application tip was used for each new sample.

Wettability of various surfactants on both stainless steel 304 coupon and stainless steel 316 coupon were evaluated using the Contact Angle Test Method described above. As shown in Table 9, Surfactant A, Surfactant F, and Surfactant E are all effective in significantly reducing the water contact angle of the acid cleaners. Cleaner comprising Acid Blend 1 and Surfactant F (50 ppm) was found extremely wettable on both 306 coupon and 314 coupon, with contact angles of less than 5° after 30 seconds. This result consistently corresponds to the cleanliness results shown in Tables 5 and 7. Acid cleaners comprising 50 ppm of Surfactant E or Surfactant A are also generally wettable and in consistent with the results of their effectiveness in soil cleaning. By contrast, acid cleaners containing anionic SLS surfactant are not as wettable as nonionic surfactants, with contact angles on 304 coupon higher than 36° after 30 seconds. This result is consistent with their inferior cleaning performance as shown in Table 5.

TABLE 9

| Contact angle measurement of acid cleaners | | | |
|---|---|---|---|
| Solution | Initial angle (°) | Angle at 10 seconds (°) | Angle at 30 seconds (°) |
| Contact angle measured on Stainless Steel Coupon 316 at 60 degree Celsius | | | |
| Water | 70.07 | 61.8 | 42.7 |
| Acid Blend 1 + 50 ppm Surfactant F | 61.3 | 27.8 | 5.3 |
| Acid Blend 1 + 100 ppm Surfactant F | 49.1 | 22.6 | 6.9 |

TABLE 9-continued

| Contact angle measurement of acid cleaners | | | |
|---|---|---|---|
| Solution | Initial angle (°) | Angle at 10 seconds (°) | Angle at 30 seconds (°) |
| Acid Blend 1 + 500 ppm Surfactant F | 28 | 9.26 | N/A |
| Acid Blend 1 + 50 ppm Surfactant E | 66.5 | 55.2 | 37.2 |
| Acid Blend 1 + 100 ppm Surfactant E | 58.5 | 27.3 | 5.7 |
| Acid Blend 1 + 500 ppm Surfactant E | 35.7 | 9.4 | N/A |
| Acid Blend 1 + 50 ppm Surfactant A | 61.7 | 35.8 | 16.5 |
| Acid Blend 1 + 100 ppm Surfactant A | 51.6 | 25.9 | 14.8 |
| Acid Blend 1 + 500 ppm Surfactant A | 27.5 | 15.7 | 3 |
| Contact angle measured on Stainless Steel Coupon 304 at 60 degree Celsius | | | |
| Water | 79.7 | 75.5 | 59.0 |
| Acid Blend 1 | 72.1 | 71.2 | 63.3 |
| Acid Blend 1 + 50 ppm Surfactant F | 49.6 | 26.8 | 3.2 |
| Acid Blend 1 + 100 ppm Surfactant F | 36.3 | 18.7 | N/A |
| Acid Blend 1 + 500 ppm Surfactant F | 23.3 | 8.4 | N/A |
| Acid Blend 1 + 50 ppm Surfactant E | 52.8 | 27.6 | N/A |
| Acid Blend 1 + 100 ppm Surfactant E | 43.5 | 13.4 | N/A |
| Acid Blend 1 + 500 ppm Surfactant E | 19.0 | N/A | N/A |
| Acid Blend 1 + 50 ppm Surfactant A | 53.2 | 33.1 | 13.4 |
| Acid Blend 1 + 100 ppm Surfactant A | 37.0 | 19.7 | 3.75 |
| Acid Blend 1 + 500 ppm Surfactant A | 24.0 | 12.4 | N/A |
| Acid Blend 1 + 50 ppm sodium lauryl sulfate | 70.8 | 61.9 | 36.2 |
| Acid Blend 1 + 100 ppm sodium lauryl sulfate | 65.7 | 61.2 | 41.1 |

Example 8: Corrosion Test for Acid Cleaners with Acid Blend 1 and Surfactant a at Different Ppm Levels Corrosion Test Method: A solution of interest was prepared according to the table above and poured into an amber glass container with a vented lid; the solutions was allowed to warm up at the temperature of interest in an oven for about 30 minutes. Two stainless steel plates, the 304 coupon and the 316 coupon, both with a size of 1×2 x 0.046 inch, were cleaned with soap and water and rinsed multiple times with acetone and water and air dried; the dried croupous were measured by weight. The two coupons were immersed in the solution at noon and the container placed in the oven to sit for 7 days, and then were removed at noon of the 7th day and washed with dish soap and DI water and scrubbed with a sponge. Once dried, the weight of the coupons were taken again. The combined weight loss of the 304 coupon and the 316 coupon was recorded as the total weight loss. The corrosion rate of the solution of interest from one week exposure (168 hours) was calculated as follows:

$$\text{Corrosion rate}(mpy) = \frac{(534,000 * \text{Total Weight Loss})}{(SS\ \text{Surface Area} * \text{Hours Exposed} * SS\ \text{Density})}$$

wherein, mpy stands for "mils per year." A corrosion rate larger than 250 mpy is considered corrosive to that specific metal by DOT (Department of Transportation) and the UN (United Nations).

Corrosion of acid cleaners comprising Acid Blend 1 and Surfactant A at different ppm levels were measured using the Corrosion Test Method as described above. As shown in Table 10, Surfactant A was found to be effective in reducing the corrosion rate of 304 coupon at 40° C., from 0.024 mpy (0 ppm) to 0.008 mpy (100 pm). At elevated temperature, 60° C., adding 50 ppm Surfactant A to Acid Blend 1 was found to significantly reduce the corrosion rate of both 304 and 316 coupons, from 0.032 mpy to 0.004 mpy, and from 0.024 mpy to 0.008 mpy, respectively. Acid Blend 1 with 100 pm Surfactant A also reduced corrosion compared to Acid Blend 1 alone in some samples.

TABLE 10

Corrosion test of acid cleaners

| Stainless steel coupon | Surfactant A (ppm) | Temp (Celsius) | Corrosion rate (mpy) |
|---|---|---|---|
| 304 | 0 | 40 | 0.024 |
| 304 | 50 | 40 | 0 |
| 304 | 100 | 40 | 0.008 |
| 316 | 0 | 40 | 0.049 |
| 316 | 50 | 40 | 0.028 |
| 316 | 100 | 40 | 0.012 |
| 304 | 0 | 60 | 0.032 |
| 304 | 50 | 60 | 0.004 |
| 304 | 100 | 60 | 0.032 |
| 316 | 0 | 60 | 0.024 |
| 316 | 50 | 60 | 0.008 |
| 316 | 100 | 60 | 0.028 |

The above specification provide a complete description of the manufacture and use of the disclosed composition. Since many embodiments can be made without departing from the spirit and scope of the invention, the invention resides in the claims.

What is claimed is:

1. A method of cleaning in place industrial biofuel equipment contaminated with solids comprising:

applying a composition to industrial biofuel clean-in-place equipment at a temperature of 40° C. or higher, the composition consisting of methane sulfonic acid, formic acid, phosphoric acid from 0.1% to 5.1% by weight of urea, and, optionally one or more additional ingredients selected from the group consisting of nonionic surfactants, builders, solvents, preservatives, corrosion inhibitors, anti-redeposition agents, fluorescing materials, and mixtures thereof, and having a pH of less than 4.0;

collecting the solids and the composition; and processing the solids and the use solution for further use by animals.

2. The method of claim 1, wherein the composition is food grade.

3. The method of claim 1, wherein the composition is feed additive compliant.

4. The method of claim 1, wherein the nonionic surfactant is selected from the group consisting of an alkyl alcohol ethoxylate, a PO-capped alkyl alcohol ethoxylate, an EO/PO copolymer, and combinations thereof.

5. The method of claim 1, wherein the pH is less than 3.5.

6. The method of claim 1, wherein the pH is less than 3.0.

7. The method of claim 1, wherein the pH is less than 2.5.

8. The method of claim 1, wherein the pH is less than 2.0.

9. The method of claim 1, wherein the pH is less than 1.5.

10. The method of claim 1, wherein the pH is less than 1.0.

11. The method of claim 1, wherein the composition is applied at a temperature of 45° C. or higher.

12. The method of claim 1, wherein the composition is applied at a temperature of 50° C. or higher.

13. The method of claim 1, wherein the composition is applied at a temperature of 55° C. or higher.

14. The method of claim 1, wherein the composition is applied at a temperature of 60° C. or higher.

15. The method of claim 1, wherein the composition is applied at a temperature of 65° C. or higher.

16. The method of claim 1, wherein the composition is applied at a temperature of 70° C. or higher.

17. The method of claim 1, wherein the composition is applied at a temperature of 75° C. or higher.

18. The method of claim 1, wherein the composition is applied at a temperature of 80° C. or higher.

19. The method of claim 1, wherein the composition is applied at a temperature of 85° C. or higher.

20. The method of claim 1, wherein the composition is applied at a temperature of 90° C. or higher.

21. The method of claim 1, wherein the composition is applied at a temperature of 95° C. or higher.

22. The method of claim 1, wherein the clean-in-place equipment is selected from the group consisting of yeast propagation systems, corn fermentation systems, liquefaction and cooking systems, corn mash and beer storage, plate and frame heat exchangers, waste heat recovery exchangers, shell and tube heat exchangers, helical coil exchangers, reboilers, transport piping, tanks and vessels, agitation blades, bars, and baffles, pumps, jet cookers, automated and manual valves, separators and centrifuges, filters and membranes, distillation columns and plates, evaporation columns, tubing and tube chests, and rotary driers.

23. The method of claim 1, wherein the composition does not generate stable foam.

24. The method of claim 1, further comprising rinsing the clean-in-place equipment with water.

25. The method of claim 1, further comprising a step of applying an oxidizer.

26. The method of claim 1, wherein the composition is applied to the clean-in-place equipment by spraying, impingement, flowing, or soaking.

27. The method of claim 1, wherein the composition contacts the equipment for 5 to 120 minutes.

28. The method of claim 1 further comprising treating the industrial biofuel equipment with NaOH caustic solution.

29. The method of claim 1, wherein the biofuel is corn ethanol.

30. The method of claim 1, wherein the solids are corn mash.

* * * * *